Dec. 17, 1963  G. L. COLLINS  3,114,451
MEANS AND TECHNIQUES IN THE PRODUCTION OF
WIRE-WOUND DEVICES AND DEVICES
MADE THEREBY
Filed April 24, 1961  2 Sheets-Sheet 1
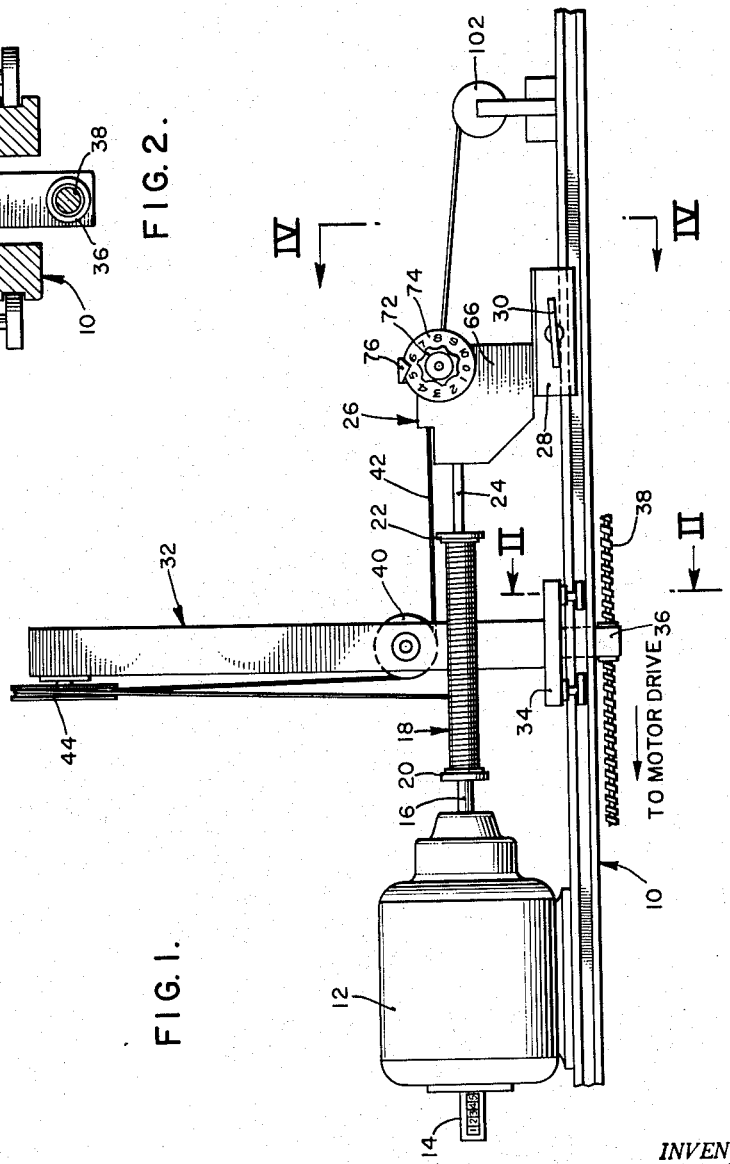
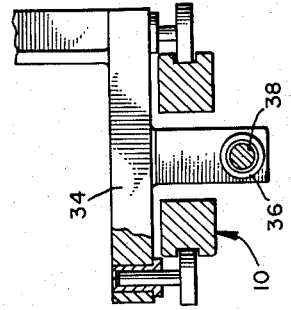
INVENTOR.
GARY L. COLLINS
BY
*Lyon & Lyon*
ATTORNEYS.

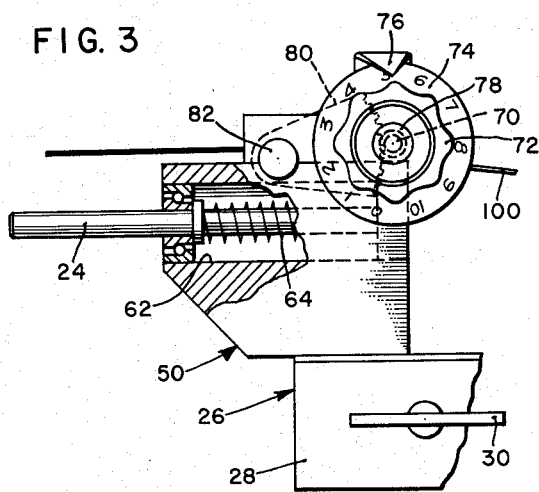

United States Patent Office 3,114,451
Patented Dec. 17, 1963

3,114,451
MEANS AND TECHNIQUES IN THE PRODUCTION OF WIRE-WOUND DEVICES AND DEVICES MADE THEREBY
Gary L. Collins, Downey, Calif., assignor to G. L. Collins Corp., Long Beach, Calif., a corporation of California
Filed Apr. 24, 1961, Ser. No. 104,950
5 Claims. (Cl. 205—1)

This invention relates generally to the controllable stretching of wire or similar stretchable material and is particularly directed to the provision of means and apparatus for controlling the diameter of wire being wound as in the forming of resistors, inductors or the like, and the article produced thereby.

In the winding of many electrical devices, particularly multilayer inductors, it is necessary that each layer of the winding be made up of individual turns equally spaced along the winding, and that the number of turns in each layer be accurately controlled. Departure from these criteria result in a finished device whose electrical characteristics may depart unacceptably from design standards. Coils of wire stock used in winding such devices frequently do not maintain exact uniformity of wire diameter throughout the entire length of the wire stock being used. As a consequence of variations of diameter along the length of wire being used, it becomes exceedingly difficult to maintain required close tolerances as to the number of turns per layer and the length of the layer axially of the inductor. Thus, if a portion of the wire stock on a coil being used to supply a winding machine happens to be somewhat undersized, then the number of turns of such undersized wire in a layer will be greater than the design number; alternatively, the axial length of the layer of undersized wire may be somewhat shorter than the design length, in order to maintain the exact number of turns required, but such shortened length is equally objectionable in terms of predictability and uniformity of ultimate electrical characteristics of the finished inductor. As a consequence of these factors, the economical production of inductors produced to accurate design standards requires means which may be easily adjusted by the operator during winding to controllably stretch the wire before it is actually wound in order thereby to control its diameter and thereby to compensate for manufacturing variations in the original wire stock so that the proper number of turns per layer along the length of the inductor can be wound. The present invention meets this need.

In accordance with a preferred form of the invention hereinafter shown and described in detail, the raw wire stock from a supply coil or the like is caused to travel through two separate paths along a friction-surfaced member, the length of one of such paths being virtually constant while the length of the other path may be controllably varied or adjusted by the operator. A rubber-surfaced roller mounted for free rotation about a vertical axis is tapered so that the diameters in successive horizontal planes become successively larger. Guide means are provided for introducing raw wire stock at a selected point axially of the roller, the wire stock being wound at least partially around the roller in order to be frictionally gripped thereby.

The wire is then fed around an idler sheave spaced from the roller and returns to a point on the roller at a greater radius from the roller axis than the radius at its original entrance point. From this return point the wire extends at least partially around the roller in order to be again frictionally gripped thereby, and thence continues to the winding machine proper where it is wound on the inductor or the like in accordance with conventional winding practice.

Thus the wire makes two journeys about the friction roller, with a free loop formed between the two journeys. Per revolution of the roller the wire is made to travel a greater distance during its second journey than during its first, and accordingly it is made to stretch during its travel through the loop around the idler sheave between journeys. The amount of stretching is a function of the difference in length of the two journeys.

Since the stretching causes a slight decrease in the diameter of the wire, it will be understood that the operator can control the diameter of the wire being wound by adjusting the guide means which in turn determines the original entrance point of the wire stock on the rubber roller.

Accordingly, it is a principal object of the present invention to disclose a novel method and apparatus for the controllable stretching of wire or similar material.

Another object of the present invention is to provide a precision transducer which is made to have precise linear characteristics as a result of stretching of wire during its fabrication.

Additional objects and purposes are to disclose an apparatus for controllably stretching wire or the like employing a frictional-surfaced roller having diameters successively increasing along the axial length of the roller, the wire being led into two paths around the roller during operation; to disclose an apparatus for carrying out the invention which may be easily incorporated in a conventional tail stock of a winding machine; and for other and additional purposes as will be understood from a study of the following description of a preferred embodiment of the invention taken in connection with the accompanying drawings in which:

FIGURE 1 is a side elevational view of the major components of a conventional winding machine, showing the apparatus in accordance with the present invention incorporated in the tail stock thereof.

FIGURE 2 is a fragmentary view of the base of the winding tower taken along the line II—II of FIGURE 1.

FIGURE 3 is a side elevational view of the tail stock incorporating the apparatus of the present invention, with a portion of the tail stock being broken away and particularly showing the adjusting dial permitting the operator to adjust the amount of stretching desired.

FIGURE 4 is an end view of the device taken generally along the line IV—IV of FIGURE 1.

FIGURE 5 is a fragmentary view of the outer end of the support platform for the friction roller showing a modified form of such roller.

FIGURE 6 is a perspective diagrammatic showing of the path of wire in accordance with the present invention.

FIGURE 7 is a sectional view of a movable core transformer or transducer according to other aspects of the present invention made in accordance with the method and apparatus described herein.

FIGURE 8 is a schematic diagram of the device of FIGURE 7.

FIGURE 9 is a graphical representation of the linear turn density of the secondary winding portions or coils of FIGURE 7.

FIGURE 10 is a graphical representation of the variation of output voltage E with core position of the transducer shown in FIGURE 7.

Referring now in detail to the drawings, there is shown in FIGURE 1 a winding machine of generally conventional construction mounted upon a bed indicated generally at 10 providing the mounting for a driving motor 12 which may have connected thereto a revolution counter 14. The output shaft 16 of the motor is connected to and supports one end of the bobbin indicated generally at 18 on which a coil of wire is to be wound as in the manufacture of an inductor or the like. Bobbin 18 includes end flanges 20 and 22, the flange 22 being supported upon a shaft 24 carried by a tail stock assembly indicated generally at 26. The latter structure is mounted upon a carrier 28 which is slidable along the bed 10 and may be fastened at any desired point by suitable fastening means such as a wing nut 30. The winding machine includes a conventional winding tower indicated generally at 32 and mounted upon a carrier 34 which is slidable longitudinally of the bed 10 and moved therealong by engagement of the collar 36 with the lead or travel screw 38. Tower 32 includes a lower idler sheave 40 around which the incoming wire 42 is led upwardly to an upper idler sheave 44 which is freely rotatable about a horizontal axis near the upper end of the tower 32 and from which the wire 42 leads downwardly to the actual winding operation on bobbin 18.

The components of the winding machine thus far referred to are conventional and no effort is here made to include all auxiliary apparatus well known in the art for accomplishing various functions during the winding operation; for example, the screw 38 may be driven by a geared relation to the driving motor 12 or by a separate driving motor as desired in accordance with known constructions.

With particular reference to FIGURES 3 and 4, it will be seen that the tail stock assembly 26 includes a base portion indicated generally at 50 carried on the carrier 28 and provided with a horizontally projecting platform 52 extending rearwardly from the upright portion of the base. At the outer end of the platform 52 there is mounted for free rotation a roller indicated generally at 54 and rotatable about the axis 56. Roller 54 has a tapered outer surface 58 which in the present illustration is shown as having its smaller end downwardly and its end of larger diameter upwardly. There may be provided in the uppermost portion of the surface 58 a portion of constant diameter indicated at 60.

With particular reference to FIGURE 3 it will be seen that base 50 includes a hollow bore 62 which serves as the housing for the tail shaft 24, the shaft being biased leftwardly as seen in FIGURES 1 and 3 by suitable spring means 64 as is conventional.

The upper end of the pedestal portion 66 of the base includes a shaft 70 rotatably journaled in the pedestal for rotation about a horizontal axis and extending generally from front to rear of the machine. At the front end of the shaft 70 there is a hand wheel 72 for turning the shaft and a dial 74 bearing suitable indicia thereon is also fixed to the shaft and rotatable with it and the hand wheel. An indicator 76 points to the selected number on the dial 74. At the rear end of the shaft 70 a pinion 78 carried on the shaft is in mesh with a gear segment 80 (see FIGURES 3 and 4), the latter element being carried on a support shaft 82 rotatably journaled in the upper portion of the pedestal 66 for rotation about a horizontal axis parallel to the axis of shaft 70. Rearwardly of the segment 80, shaft 82 has fixed thereto a rearwardly and angularly extending support plate or arm 84 upon which is rotatably mounted an idler sheave 86 for rotation about the axis 88. Further outwardly on the support arm 84 there is fixed to the arm a rearwardly extending guide finger 90 constituting the guide means for incoming wire stock to the present device. It will be seen that rotation of the hand wheel 72 will cause rotation of the gear segment 80 about the axis of the support shaft 82 and thereby cause swinging movement of the support arm 84 about the axis of the shaft 82, thereby moving the idler sheave 86 and the guide finger 90 upwardly or downwardly as seen in FIGURE 4. It may be noted that the position of the parts in FIGURES 3 and 4 show their relationship when the guide finger 90 and the idler sheave 86 are approximately midway of their adjustable travel upwardly or downwardly.

Operation of the coil-winding apparatus will perhaps be best understood by reference to FIGURE 6 which shows in perspective diagrammatic form the component parts of the device corresponding to their positions seen in FIGURES 3 and 4. It will be seen that the incoming wire stock 100 from the supply coil 102 seen in FIGURE 1 is led across in sliding contact with the guide finger 90 and continues through a partial turn around the frictional roller 54 at a point spaced from the upper and lower ends of the roller. Thus in the present illustration the wire 100 extends through approximately three-fourths of a complete turn in frictional contact with the roller 54 and continues to the idler sheave 86 and continues from the latter element to return for its second journey around the friction roller 54. It will be noted that the return point 105 where the wire commences its second journey around the friction roller is in the upper portion of the roller and desirably at the point of maximum diameter thereof. After making approximately a three-quarter turn about the friction roller, the wire emerges from the roller to follow the path in accordance with conventional technique as indicated in FIGURE 1, the wire there being referred to by reference character 42, since the wire at that point is of a somewhat different diameter than the stock wire 100 by reason of the stretching undergone by the path shown in FIGURE 6. Thus the first journey of the wire 100 about the friction roller is at a substantially smaller diameter of that roller than the second journey around the roller and the wire is accordingly stretched between its two journeys around the friction roller. It will be seen that the amount of such stretching will be dependent upon the inclination of the support arm 84 below the horizontal, since the guide finger 90 carried at the outer end of the support arm determines the entrance point of the wire. It will be readily seen that, the lower the entrance point of the wire stock, the greater will be the amount of stretching impressed on the wire during its path shown in FIGURE 6. It will be noted that the guide finger 90 will normally assume a position somewhat lower than the lowermost point of the idler sheave 86, so that the wire crossing at the point indicated at 104 will have very little if any sliding contact and thus will not harm the insulation on the wire. Similarly, the length of wire on the return path from the idler sheave 86 to the roller 54 is desirably virtually horizontal, the idler sheave at that point being virtually on the axis of support shaft 82 so that the return point 105 of the wire to the friction roller does not move longitudinally of the roller despite any angular swinging adjustment of the support arm 84 and the idler sheave 86 carried thereon.

The friction roller 54 provides virtually infinite adjustability within the range of the device for the amount of stretching to be impressed upon the wire fed through the apparatus. In FIGURE 5 there is shown a modified construction of the friction roller wherein there is provided a number of separate frictional sheaves 110, 112, 114 and 116, all fixed to one another and mounted for free rotation about the vertical axis 56 at the outer end of the platform 52. Thus the construction of FIGURE 5 provides for selection by step of the amount of stretching to be impressed upon the wire being wound, and it will be understood that the amount of such stretching cannot be as easily adjusted as in the case of the embodiment heretofore described and illustrated in detail.

It will be understood that the location of the stock coil 102 is so chosen that wire 100 coming therefrom is at a somewhat lower height than the lowermost position of the guide finger 90, so the guide finger 90 in all events will determine the entrance point of the wire on the friction roller 54. It will further be understood that drag means of conventional construction may be incorporated in the mounting of the supply coil 102 such as by a separate motor drive or the like in order to impose upon the wire 100 any desired back force during winding, as is conventional in winding machines.

The method and apparatus described above is particularly useful in winding precision coils wherein turns of a coil must be accurately located to establish a predetermined magnetic flux pattern and particularly so in a movable core transformer illustrated in FIGURE 7 wherein mechanical movement of a movable core element is measured by voltage output on a linear scale.

Although many proposed constructions of movable core transformers have been known and used in the past, it is believed that none have been capable of producing a voltage output which is virtually perfectly linear with respect to mechanical input, within the range of movement for which the device is designed. In accordance with certain aspects of the present invention whereby the wire is stretched to compensate for conditions which would otherwise result in a non-linear relationship between the output voltage and input mechanical movement, a virtually perfectly linear relationship between output voltage and mechanical movement is achieved.

By controllably stretching the wire in the winding operation, a device is achieved for generating or producing magnetizing force or magnetomotive force of uniform strength throughout the length of the movement of the core. Thus, referring to FIGURE 7, there is shown a form of the invention including a longitudinally extending primary winding 120 wound by controllably stretching the wire so that an accurate number of turns are positioned uniformly in a predetermined area. Such winding 120 includes leads 121 connectable to a source of A.C. power 122. The primary winding 120 is wound in the manner described above by selectively and controllably stretching the wire so as to achieve a uniform linear turn density throughout its length as illustrated schematically by the evenly spaced turns seen at 120 in FIGURE 8. The primary winding 120 is formed with a cylindrical passage 124 therethrough, within which a magnetic core member 126 is movable longitudinally of the primary winding 120. The magnetic core member 126 has attached thereto an outwardly projecting extension or arm 128 which may be connected to, or may itself serve as, a probe or other sensing element responsive to input mechanical movement in any of many known manners. The movement of extension arm 128 is longitudinal or axial of the primary winding 120 as indicated by the double-headed arrow adjacent the outer end of the arm 128.

The secondary winding of the device in FIGURE 7 includes a pair of coils indicated generally by A and B, both of which are wound by controllably and selectively stretching the wire as previously described.

Coil A is made up of a number of turns connected in series and coil B is similarly made up to occupy a predetermined space notwithstanding original non-uniformities in wire diameter and irregular conditions prevailing during winding, all of the same being compensated for by controllably and selectively stretching the wire as previously described.

The coils A and B are connected in series and their turns are in the opposite sense; that is, the turns of coil A are in one sense which from a given viewpoint is clockwise, while the turns of coil B from the same viewpoint are counterclockwise. The clockwise turns of coil A may commence, for example, at point 130, such clockwise turns continuing to point 132. The counterclockwise turns of coil B extend from the point 134 to point 136. Output leads 137 and 138, respectively, are connected to points 130 and 136 and to output terminals E. The points 132 and 134, both constituting the innermost ends of the respective coils A and B, are connected together by lead 133. In a typical installation points 132 and 134 may be centered longitudinally of the windings, but this is not necessary as it may be desired that the zero signal point be offset from such center.

The respective coils A and B are wound with a maximum linear turn density at the outermost end of the winding, the linear turn density tapering or decreasing uniformly to the longitudinal center of the device represented by points 132 and 134, this condition being achieved by controllably and selectively stretching the wire as it is being wound. That is to say, in any sectional plane normal to the axis of the coils A and B there is a number of turns proportional to the distance of such sectional plane from the longitudinal center of the secondary winding. The total number of turns in coil A is typically but not necessarily equal to the total number of turns in coil B and the two coils are symmetrically disposed relative to a plane normal to the axis of the windings.

In the construction of a device of the character illustrated in FIGURE 7, the space 160 not occupied by coils A and B of the secondary winding may be used for installation of control or safety devices such as thermocouples or the like. I may also use a portion of the space 160 for a number of turns of Fiberglas wire or similar filamentary dielectric material indicated generally at 162 and built up to contact the inner cylindrical surface of a shell or casing 164 surrounding the transformer. Desirably, the shell 164 is of magnetic material in order to magnetically isolate and shield the windings. By this means the center portion of the transformer, being somewhat less rigid mechanically because of the small number of turns in the secondary, is resiliently supported by the quantity 162 of such dielectric material.

In FIGURE 8 there is shown an electrical schematic diagram of the device of FIGURE 7 with corresponding parts similarly identified by reference characters. It will be readily seen that with the magnetic member 126 at the midpoint longitudinally of the windings, the voltage generated in coil A is equal in magnitude but opposite in sign to that generated in coil B. Consequently, the output voltage measured at the terminals E is zero under these conditions. With the secondary coils A and B wound as above described, I have found that longitudinal movement of the magnetic member 126 causes the output voltage measured at terminals E to vary virtually perfectly linearly with such longitudinal motion, as graphically illustrated in FIGURE 10.

In FIGURE 9 there is graphically presented for coils A and B the relationship of linear turn density plotted against the winding length, thus emphasizing the uniform decrease or taper of the linear turn density longitudinally of the winding, such density being zero at the midpoint, and this particular relationship is accomplished by selectively and controllably stretching the wire as it is wound in forming the coils A and B.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A device for controllably and adjustably stretching wire or the like comprising: a base; a vertically elongated friction-surfaced roller mounted for free rotation on said base about a vertical axis and having successively increasing diameters in successive horizontal planes; an idler sheave carried by the base for free rotation about an axis horizontally spaced from the roller axis and adjustably positionable between a vertical orientation substantially parallel to the roller axis and a transverse orientation substantially inclined thereto; adjustably positionable guide means for feeding wire to the friction roller at a desired point thereon; means for simultaneously positioning said sheave axis and guide means; and means for drawing wire from said friction roller.

2. The device as stated in claim 1 wherein a line tangent to said roller and sheave remains virtually stationary despite movement of said positioning means.

3. The device as stated in claim 1 wherein said roller has a smooth surface of tapered diameter.

4. The device as stated in claim 3 wherein the roller surface includes a portion at its larger end of constant diameter.

5. The device as stated in claim 1 wherein said roller includes a series of concentric sheaves of progressively increasing diameter longitudinally of the roller.

References Cited in the file of this patent

UNITED STATES PATENTS

| | | |
|---|---|---|
| 342,040 | Reese | May 18, 1886 |
| 1,064,936 | Scott | June 17, 1913 |
| 1,669,743 | Elder | May 15, 1928 |
| 1,727,664 | Nacken | Sept. 10, 1929 |
| 2,149,436 | Hadenfeldt | Mar. 7, 1939 |
| 2,383,118 | Ferenci | Aug. 21, 1945 |
| 2,564,221 | Hornfeck | Aug. 14, 1951 |
| 2,985,854 | Brosh | May 23, 1961 |